United States Patent
Lawson (10) Patent No.: US 10,672,218 B1
(45) Date of Patent: Jun. 2, 2020

(54) PERSONAL ELECTRONIC CHARGING STATION

(71) Applicant: Rick Lawson, Charlton, MA (US)

(72) Inventor: Rick Lawson, Charlton, MA (US)

( * ) Notice: Subject to any disclaimer, the term of this patent is extended or adjusted under 35 U.S.C. 154(b) by 428 days.

(21) Appl. No.: 15/627,525

(22) Filed: Jun. 20, 2017

(51) Int. Cl.
  *H02J 7/00* (2006.01)
  *G07F 15/00* (2006.01)
  *H04B 1/3827* (2015.01)
  *G06Q 50/06* (2012.01)

(52) U.S. Cl.
  CPC ........... *G07F 15/006* (2013.01); *G06Q 50/06* (2013.01); *H02J 7/0021* (2013.01); *H02J 7/0045* (2013.01); *H04B 1/3833* (2013.01)

(58) Field of Classification Search
  CPC ..... G07F 15/006; H02J 7/0021; H02J 7/0045; H04B 1/3833; G06Q 50/06
  USPC .......................................................... 320/107
  See application file for complete search history.

(56) References Cited

U.S. PATENT DOCUMENTS

| | | | | |
|---|---|---|---|---|
| 3,943,335 A * | 3/1976 | Kinker | G07D 11/00 | 235/379 |
| 4,447,785 A * | 5/1984 | Wright | H02J 7/0034 | 320/105 |
| 4,753,387 A * | 6/1988 | Fee | G07D 11/0096 | 232/43.3 |
| 5,499,707 A * | 3/1996 | Steury | G07F 7/069 | 186/36 |
| 5,744,933 A * | 4/1998 | Inoue | G06Q 20/127 | 320/110 |
| 6,029,851 A * | 2/2000 | Jenkins | G07F 7/06 | 221/102 |
| D528,322 S | 9/2006 | Nicoletti | | |
| 7,741,808 B2 * | 6/2010 | Fowler | B62B 3/1424 | 320/107 |
| 7,755,374 B2 * | 7/2010 | Cojocneanu | G01R 31/2887 | 324/750.25 |
| 7,800,914 B2 * | 9/2010 | Dully | G06F 1/1632 | 361/756 |

(Continued)

FOREIGN PATENT DOCUMENTS

CA     2769915 A1    9/2012

OTHER PUBLICATIONS

"Advantages and Drawbacks of Pneumatic, Hydraulic, and Electric Linear Actuators," Samantha Rosenfeld, TiMotion, published Jul. 12, 2017, accessed online Oct. 17, 2019, www.timotion.com/en/news/news_content/blog_articles/general/advantages_and_drawbacks_of_pneumatic,_hydraulic,_and_electric_linear_actuators?upcls=1481.*

*Primary Examiner* — Robert Grant
*Assistant Examiner* — John T Trischler
(74) *Attorney, Agent, or Firm* — Kyle A. Fletcher, Esq.

(57) ABSTRACT

The personal electronic charging station is adapted for use in charging one or more personal data devices. The personal electronic charging station is adapted for use one or more electronic payment systems selected from the group consisting of credit card payment systems or a token based payment system. The personal electronic charging station is a switched charging station that distributes electric power to the personal data devices on a fee for service basis. Once the fee has been received through the electronic payment system, the personal electronic charging station will distribute electrical power for use in charging the one or more personal data devices. The personal electronic charging station comprises a cabinet, a charging circuit, and a control system.

11 Claims, 5 Drawing Sheets

(56) References Cited

U.S. PATENT DOCUMENTS

| | | | | |
|---|---|---|---|---|
| 7,881,965 B2* | 2/2011 | Bowles | G06Q 10/30 | 705/14.37 |
| 7,948,208 B2* | 5/2011 | Partovi | H02J 7/0027 | 320/108 |
| 8,040,102 B2* | 10/2011 | Kao | F21S 8/086 | 136/291 |
| 8,069,100 B2* | 11/2011 | Taylor | G06Q 20/10 | 705/34 |
| 8,174,147 B2* | 5/2012 | Fleisig | H01R 13/72 | 174/493 |
| 8,234,189 B2* | 7/2012 | Taylor | G06Q 20/10 | 705/34 |
| 8,239,262 B2* | 8/2012 | Bowles | G06Q 10/30 | 705/14.37 |
| 8,423,404 B2* | 4/2013 | Bowles | G06Q 10/30 | 705/14.37 |
| 8,456,819 B1* | 6/2013 | Smith | A47B 96/00 | 312/223.1 |
| 8,560,147 B2* | 10/2013 | Taylor | B60L 1/003 | 701/2 |
| 8,629,652 B2* | 1/2014 | Partovi | H02J 7/0027 | 320/108 |
| 8,718,717 B2* | 5/2014 | Vaknin | H02J 7/0027 | 455/343.1 |
| 8,768,533 B2* | 7/2014 | Ichikawa | H04L 25/028 | 701/1 |
| 8,862,304 B2* | 10/2014 | Chen | H02J 7/00 | 701/22 |
| 8,862,388 B2* | 10/2014 | Wu | B60L 1/003 | 701/425 |
| 8,872,379 B2* | 10/2014 | Ruiz | G06Q 50/06 | 307/66 |
| 8,878,487 B2* | 11/2014 | Wu | B60L 1/003 | 320/108 |
| 8,904,198 B1* | 12/2014 | Pinto | G07F 15/006 | 455/572 |
| 8,996,212 B2* | 3/2015 | Chen | H02J 7/00 | 701/22 |
| 9,035,606 B2* | 5/2015 | Ross | H02J 7/0042 | 320/109 |
| 9,123,035 B2* | 9/2015 | Penilla | G06Q 20/18 | |
| 9,124,085 B2* | 9/2015 | Wu | H02H 1/00 | |
| 9,129,272 B2* | 9/2015 | Penilla | G06Q 20/18 | |
| 9,129,461 B2* | 9/2015 | Luke | B60L 1/003 | |
| 9,176,680 B2* | 11/2015 | Chen | H02J 7/00 | |
| 9,177,305 B2* | 11/2015 | Penilla | G06Q 20/18 | |
| 9,177,306 B2* | 11/2015 | Penilla | G06Q 20/18 | |
| 9,182,244 B2* | 11/2015 | Luke | B60L 1/003 | |
| 9,193,277 B1* | 11/2015 | Penilla | G06Q 20/18 | |
| 9,203,245 B2* | 12/2015 | Aloe | H02J 7/0003 | |
| 9,269,993 B2* | 2/2016 | Khaitan | H01M 10/46 | |
| 9,275,505 B2* | 3/2016 | Taylor | B60L 1/003 | |
| 9,324,204 B2* | 4/2016 | Naghi | G07C 9/00134 | |
| 9,330,520 B2* | 5/2016 | Phelps | G07F 15/00 | |
| 9,335,179 B2* | 5/2016 | Penilla | G06Q 20/18 | |
| 9,337,920 B2* | 5/2016 | Chen | H02B 1/044 | |
| 9,373,967 B1* | 6/2016 | Sullivan | H02J 7/0027 | |
| 9,424,697 B2* | 8/2016 | Wu | G07F 15/006 | |
| 9,461,501 B2* | 10/2016 | Partovi | H02J 7/0027 | |
| D772,811 S* | 11/2016 | Skurdal | D13/108 | |
| 9,496,736 B1* | 11/2016 | Johansson | H02J 7/0027 | |
| 9,552,682 B2* | 1/2017 | Luke | G01C 21/3476 | |
| 9,565,565 B2* | 2/2017 | Baldasare | H04W 12/06 | |
| 9,597,973 B2* | 3/2017 | Penilla | G06Q 20/18 | |
| 9,711,981 B2* | 7/2017 | Sun | H01M 2/1044 | |
| 9,715,780 B2* | 7/2017 | Garrison | G07F 9/105 | |
| D795,186 S* | 8/2017 | Skurdal | D13/108 | |
| D795,187 S* | 8/2017 | Skurdal | D13/108 | |
| D795,188 S* | 8/2017 | Skurdal | D13/108 | |
| D795,189 S* | 8/2017 | Skurdal | D13/108 | |
| 9,738,168 B2* | 8/2017 | Penilla | G06Q 20/18 | |
| 9,760,875 B2* | 9/2017 | Viner | G06Q 20/145 | |
| 9,780,579 B2* | 10/2017 | Frankenberger | H02J 7/0027 | |
| 9,800,067 B2* | 10/2017 | Hohl | H02J 7/0044 | |
| 9,830,753 B2* | 11/2017 | Luke | B60L 1/003 | |
| 9,836,910 B1* | 12/2017 | Pierre | G07F 9/023 | |
| 9,854,438 B2* | 12/2017 | Luke | H02J 7/0013 | |
| 9,870,670 B2* | 1/2018 | Yau | G07F 7/06 | |
| 9,904,911 B2* | 2/2018 | Bowles | G06Q 10/30 | |
| 9,904,917 B2* | 2/2018 | Ruggiero | G06Q 20/18 | |
| 9,908,506 B2* | 3/2018 | Taylor | H02J 7/00 | |
| 9,911,252 B2* | 3/2018 | Wu | B60L 1/003 | |
| 9,925,882 B2* | 3/2018 | Penilla | G06Q 20/18 | |
| 10,037,526 B2* | 7/2018 | Campos | G06Q 20/3674 | |
| 10,037,647 B1* | 7/2018 | Hughes | G07F 17/0042 | |
| 10,037,652 B2* | 7/2018 | Eby | G07F 17/3286 | |
| 10,040,359 B2* | 8/2018 | Chen | B60L 53/80 | |
| 10,049,534 B2* | 8/2018 | St. George | G07G 1/0018 | |
| 10,050,457 B2* | 8/2018 | Todasco | H02J 7/0047 | |
| 10,055,911 B2* | 8/2018 | Luke | B60L 53/305 | |
| 10,070,250 B2* | 9/2018 | Baldasare | H04W 8/18 | |
| 10,084,329 B2* | 9/2018 | Hamilton | G07F 7/069 | |
| 10,086,714 B2* | 10/2018 | Penilla | G06Q 20/18 | |
| 10,096,183 B2* | 10/2018 | Nitu | G07C 9/00912 | |
| 10,097,020 B2* | 10/2018 | Truong | G07C 9/00142 | |
| 10,128,032 B2* | 11/2018 | Ahladas | H01F 7/16 | |
| 10,135,268 B1* | 11/2018 | Gokcebay | H04B 1/3883 | |
| 10,147,984 B2* | 12/2018 | O'Hora | H01M 10/625 | |
| 10,157,376 B2* | 12/2018 | Aloe | H02J 7/0003 | |
| 10,186,094 B2* | 1/2019 | Wu | B60L 50/40 | |
| 10,198,892 B2* | 2/2019 | Taylor | G06Q 20/10 | |
| 10,209,090 B2* | 2/2019 | Luke | B60L 1/003 | |
| 10,225,440 B2* | 3/2019 | Truong | H04B 5/0037 | |
| 10,245,964 B2* | 4/2019 | Penilla | G06Q 20/18 | |
| 10,260,735 B2* | 4/2019 | Chien | F21V 33/004 | |
| 10,264,213 B1* | 4/2019 | Sculley | H04N 7/15 | |
| 10,283,984 B2* | 5/2019 | Maguire | H02J 7/0044 | |
| 10,340,712 B2* | 7/2019 | Hobson | H02J 7/0027 | |
| 10,345,843 B2* | 7/2019 | Luke | B60L 1/02 | |
| 10,355,502 B2* | 7/2019 | Chen | H02J 7/0044 | |
| 10,396,574 B2* | 8/2019 | Maguire | G06Q 20/18 | |
| 10,439,408 B1* | 10/2019 | Bastiyali | A61L 2/10 | |
| 10,445,708 B2* | 10/2019 | Hunt | H04M 1/0287 | |
| 2003/0025476 A1* | 2/2003 | Trela | H02J 7/0003 | 320/107 |
| 2003/0034757 A1* | 2/2003 | Woodnorth | H01M 10/425 | 320/132 |
| 2003/0141840 A1* | 7/2003 | Sanders | H02J 7/0027 | 320/107 |
| 2005/0104555 A1* | 5/2005 | Simmonds-Short | H02J 7/0027 | 320/107 |
| 2007/0279002 A1* | 12/2007 | Partovi | H02J 7/0027 | 320/115 |
| 2008/0191725 A1* | 8/2008 | Cojocneanu | G01R 31/2887 | 324/750.25 |
| 2008/0231228 A1* | 9/2008 | Fowler | B62B 3/1424 | 320/107 |
| 2009/0267564 A1* | 10/2009 | Gerber | H02J 7/0027 | 320/114 |
| 2010/0169231 A1* | 7/2010 | Bowles | G06Q 10/30 | 705/306 |
| 2010/0174629 A1* | 7/2010 | Taylor | G06Q 20/10 | 705/34 |
| 2010/0176762 A1* | 7/2010 | Daymude | H02J 7/0027 | 320/115 |
| 2011/0140656 A1* | 6/2011 | Starr | B60L 53/51 | 320/109 |
| 2011/0145073 A1* | 6/2011 | Richman | G06Q 30/02 | 705/14.66 |
| 2011/0204720 A1* | 8/2011 | Ruiz | G06Q 50/06 | 307/66 |
| 2011/0235853 A1* | 9/2011 | Bowles | G06Q 10/30 | 382/100 |
| 2011/0273132 A1* | 11/2011 | Khaitan | H01M 10/46 | 320/101 |
| 2011/0301748 A1* | 12/2011 | Lecarpentier | H02J 7/0027 | 700/232 |
| 2012/0041843 A1* | 2/2012 | Taylor | G06Q 20/10 | 705/26.41 |

(56) References Cited

U.S. PATENT DOCUMENTS

| | | | |
|---|---|---|---|
| 2012/0078413 A1* | 3/2012 | Baker, Jr. | G07F 17/12 700/232 |
| 2012/0126745 A1* | 5/2012 | Partovi | H02J 7/0027 320/108 |
| 2012/0129577 A1* | 5/2012 | Vaknin | H02J 7/0027 455/573 |
| 2012/0150670 A1* | 6/2012 | Taylor | G06Q 20/10 705/16 |
| 2012/0249054 A1* | 10/2012 | King | H02J 7/0003 320/107 |
| 2012/0259735 A1* | 10/2012 | Taylor | G06Q 20/10 705/26.41 |
| 2012/0262112 A1* | 10/2012 | Ross | H02J 7/0042 320/109 |
| 2012/0271723 A1* | 10/2012 | Penilla | G06Q 20/18 705/16 |
| 2012/0294490 A1* | 11/2012 | Bowles | G06Q 10/30 382/103 |
| 2013/0026971 A1* | 1/2013 | Luke | B60L 1/003 320/104 |
| 2013/0026972 A1* | 1/2013 | Luke | G07F 17/12 320/106 |
| 2013/0026973 A1* | 1/2013 | Luke | H02J 7/00 320/106 |
| 2013/0027183 A1* | 1/2013 | Wu | G07F 15/006 340/5.64 |
| 2013/0030580 A1* | 1/2013 | Luke | B60L 1/003 700/286 |
| 2013/0030581 A1* | 1/2013 | Luke | B60L 7/06 700/286 |
| 2013/0030920 A1* | 1/2013 | Wu | B60L 1/003 705/14.64 |
| 2013/0030991 A1* | 1/2013 | Neidlinger | G07F 15/006 705/39 |
| 2013/0031318 A1* | 1/2013 | Chen | H02J 7/00 711/154 |
| 2013/0057203 A1 | 3/2013 | Jones | |
| 2013/0132307 A1* | 5/2013 | Phelps | H02J 7/0027 705/412 |
| 2013/0226679 A1* | 8/2013 | Bowles | G06Q 10/30 705/14.11 |
| 2013/0307382 A1* | 11/2013 | Garrison | G07F 9/105 312/215 |
| 2014/0012462 A1* | 1/2014 | Chen | H02J 7/00 701/33.4 |
| 2014/0019255 A1* | 1/2014 | Wu | B60L 1/003 705/14.64 |
| 2014/0028089 A1* | 1/2014 | Luke | B60L 1/003 307/9.1 |
| 2014/0103873 A1* | 4/2014 | Partovi | H02J 7/0027 320/108 |
| 2014/0163813 A1* | 6/2014 | Chen | H02J 7/00 701/33.3 |
| 2014/0191033 A1* | 7/2014 | Wojcik | G06K 7/082 235/449 |
| 2014/0239883 A1* | 8/2014 | Hobson | H02J 7/0027 320/107 |
| 2014/0253021 A1* | 9/2014 | Luke | H02J 7/0013 320/107 |
| 2014/0266006 A1* | 9/2014 | Luke | B60L 53/68 320/106 |
| 2014/0279576 A1* | 9/2014 | Luke | G06Q 10/30 705/308 |
| 2014/0307439 A1* | 10/2014 | Chien | H02J 7/0042 362/253 |
| 2014/0312691 A1 | 10/2014 | Dolijack | |
| 2014/0354214 A1* | 12/2014 | Phelps | G07F 15/00 320/107 |
| 2014/0368156 A1* | 12/2014 | Aloe | H02J 7/0003 320/106 |
| 2015/0025923 A1* | 1/2015 | Wu | B60L 1/003 705/5 |
| 2015/0045947 A1* | 2/2015 | Yau | G07F 7/06 700/237 |
| 2015/0084590 A1* | 3/2015 | Pearlman | H02J 7/0027 320/111 |
| 2015/0123468 A1* | 5/2015 | Wu | H02H 1/00 307/10.1 |
| 2015/0137759 A1* | 5/2015 | Palmer | H02J 7/0013 320/112 |
| 2015/0153967 A1* | 6/2015 | Chen | H02J 7/00 711/101 |
| 2015/0185040 A1* | 7/2015 | Wu | B60L 50/40 701/454 |
| 2015/0193995 A1* | 7/2015 | Naghi | G07C 9/00134 340/568.1 |
| 2015/0194001 A1 | 7/2015 | Nighi | |
| 2015/0249353 A1* | 9/2015 | Hamilton, IV | H02J 7/0045 320/114 |
| 2015/0278786 A1* | 10/2015 | Ruggiero | G06Q 20/18 705/17 |
| 2015/0336465 A1* | 11/2015 | Luke | H02J 7/00 320/109 |
| 2015/0380964 A1* | 12/2015 | Tischer | H02J 7/0044 320/114 |
| 2016/0000647 A1* | 1/2016 | Eberhardt | A61H 23/0263 601/70 |
| 2016/0043584 A1* | 2/2016 | Sun | H01M 2/1044 320/107 |
| 2016/0068075 A1* | 3/2016 | Chen | B60L 53/51 320/107 |
| 2016/0071079 A1* | 3/2016 | Aloe | H02J 7/0003 705/17 |
| 2016/0079780 A1* | 3/2016 | Lasher | H02J 7/0027 320/101 |
| 2016/0098688 A1* | 4/2016 | Hunt | G06Q 20/18 705/308 |
| 2016/0099590 A1* | 4/2016 | Velderman | H02J 7/0027 320/113 |
| 2016/0145903 A1* | 5/2016 | Taylor | H02J 7/00 701/2 |
| 2016/0165443 A1* | 6/2016 | Baldasare | H04W 12/06 455/411 |
| 2016/0180632 A1* | 6/2016 | Santana | H02J 7/0027 700/238 |
| 2016/0347281 A1* | 12/2016 | Wu | H02J 7/00 |
| 2017/0025896 A1* | 1/2017 | Partovi | H02J 7/0027 |
| 2017/0033579 A1* | 2/2017 | Maguire | H02J 7/0044 |
| 2017/0039660 A1* | 2/2017 | Tourigny | H01M 10/42 |
| 2017/0040815 A1* | 2/2017 | Todasco | H02J 7/0047 |
| 2017/0097652 A1* | 4/2017 | Luke | H02J 7/00 |
| 2017/0150304 A1* | 5/2017 | Baldasare | H04W 8/18 |
| 2017/0279170 A1* | 9/2017 | O'Hora | H01M 10/625 |
| 2017/0282736 A1* | 10/2017 | Goei | B60L 53/665 |
| 2017/0288449 A1* | 10/2017 | Truong | G07C 9/00142 |
| 2017/0331319 A1* | 11/2017 | Nitz | H02J 7/0027 |
| 2018/0012438 A1* | 1/2018 | Sinofsky | G07F 15/005 |
| 2018/0020793 A1* | 1/2018 | Rao | A45C 15/00 320/114 |
| 2018/0020794 A1* | 1/2018 | Rao | A45C 15/00 320/114 |
| 2018/0026459 A1* | 1/2018 | Rao | A45C 15/06 320/114 |
| 2018/0070693 A1* | 3/2018 | Bloomfield | A45C 7/0086 |
| 2018/0137715 A1* | 5/2018 | Yau | G07F 7/06 |
| 2018/0166896 A1* | 6/2018 | Chen | H02J 7/0027 |
| 2018/0182188 A1* | 6/2018 | Luke | H02J 7/00 |
| 2018/0205247 A1* | 7/2018 | Maguire | G07F 9/10 |
| 2018/0247280 A1* | 8/2018 | Bowles | G06Q 10/30 |
| 2018/0257603 A1* | 9/2018 | Taylor | H02J 7/00 |
| 2018/0270661 A1* | 9/2018 | Luke | H02J 7/0013 |
| 2018/0272990 A1* | 9/2018 | Chen | H02J 7/00 |
| 2018/0351375 A1* | 12/2018 | Baldasare | H02J 7/0021 |
| 2019/0006862 A1* | 1/2019 | Hamilton, IV | H02J 7/0045 |
| 2019/0103641 A1* | 4/2019 | O'Hora | H01M 10/625 |
| 2019/0109475 A1* | 4/2019 | Todasco | H02J 7/0047 |
| 2019/0157881 A1* | 5/2019 | Velderman | H02J 7/0027 |

(56) References Cited

U.S. PATENT DOCUMENTS

2019/0168627 A1* 6/2019 Chen .................. B60L 53/51
2019/0213809 A1* 7/2019 Luke .................. B60L 1/00

* cited by examiner

FIG. 6

PERSONAL ELECTRONIC CHARGING STATION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of circuit arrangements for the supply and distribution of electric power, more specifically, a circuit arrangement for charging or depolarizing batteries.

SUMMARY OF INVENTION

The personal electronic charging station is adapted for use in charging one or more personal data devices. The personal electronic charging station is adapted for use one or more electronic payment systems selected from the group consisting of credit card payment systems, a hotel key or chip-based system, or a token based payment system. The personal electronic charging station is a switched charging station that distributes electric power to the personal data devices on a fee for service basis. Once the fee has been received through the electronic payment system, the personal electronic charging station will distribute electrical power for use in charging the one or more personal data devices.

These together with additional objects, features and advantages of the personal electronic charging station will be readily apparent to those of ordinary skill in the art upon reading the following detailed description of the presently preferred, but nonetheless illustrative, embodiments when taken in conjunction with the accompanying drawings.

In this respect, before explaining the current embodiments of the personal electronic charging station in detail, it is to be understood that the personal electronic charging station is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal electronic charging station.

It is therefore important that the claims be regarded as including such equivalent construction insofar as they do not depart from the spirit and scope of the personal electronic charging station. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The personal electronic charging station 100 (hereinafter invention) comprises a cabinet 101, a charging circuit 102, a control system 103, and a second cabinet 104. The charging circuit 102 is contained within the first cabinet 101. The control system 103 is electrically connected to the charging circuit 102. The control system 103 is mounted in the second cabinet 104. Alternatively, the control system 103 may be mounted within the first cabinet 101 or housed in a separate cabinet. The design parameter that determines whether the control system 103 is contained within the first cabinet 101, second cabinet 104 or housed separately are discussed elsewhere within this disclosure. The invention 100 is adapted for use in charging one or more personal data devices 151. The invention 100 is adapted for use with one or more electronic payment systems selected from the group consisting of credit card payment systems or a token based payment system. The invention 100 is adapted for use with the national electric grid 152. The invention 100 is a switched charging station that distributes electric power to the one or more personal data devices 151 on a fee for service basis. Once the fee has been received through the electronic payment system, the invention 100 will distribute electrical power for use in charging the one or more personal data devices 151.

The first cabinet 101 comprises a first chamber 111, a motorized mount 112, and a plurality of charging apertures.

The plurality of charging apertures 113 are apertures that are formed within the first chamber 111. The first chamber 111 is mounted in the motorized mount 112. The plurality of charging apertures are formed in the first chamber 111. The second cabinet 104 comprises a second chamber 115 and one or more interface apertures 114. The plurality of one or more interface apertures 114 are apertures that are mounted in and accessible through the second chamber 115.

The first chamber 111 is a first hollow rectangular box that further comprises a plurality of lips 118. The first chamber 111 is further defined with a first face 141. The first face 141 is the surface of the first chamber 111 within which the plurality of charging apertures 113 are formed. The first face 141 is further defined with a first edge 142 and a second edge 143. The first edge 142 is an edge selected from the edges that form the perimeter of the first face 141. The second edge 143 is the edge along the perimeter of the first face 141 that is distal from the first edge 142. Both the first edge 142 and the second edge 143 will have a lip selected from the plurality of lips 118 formed along it. Each of the plurality of lips 118 is a rim that projects away from the interior of the first chamber 111 from an edge selected from the first edge 142 or the second edge 143.

The second chamber 115 is a second hollow rectangular box. The second chamber 115 is further defined with a second face 161. The second face 161 is the surface of the second chamber 115 within which the plurality of one or more interface apertures 114 are located. As shown most clearly in FIG. 5, the second chamber 115 is mounted on a vertical surface 163 such that the one or more interface apertures 114 are readily accessible for receiving fee information for access to the charging service.

The motorized mount 112 prevents access to the plurality of charging apertures 113, and by implication the charging circuit 102, until an appropriate fee has been via through via the electronic payment system. The motorized mount 112 is attached on the inferior side of a horizontal structure 162, such as a table top, or underneath a bar surface, such that: 1) the first chamber is mounted in the motorized mount such that the plurality of charging apertures form the superior surface of the first chamber; and, 2) the motorized mount is attached on the inferior side of a horizontal structure. As a result of this arrangement, access to the first face 141 is blocked until payment for services is received. Payment information is accessed through equipment that is mounted in the one or more interface apertures 114. The motorized mount 112 is a structure that further comprises a plurality of slide grooves 116, and a motor 117. As shown most clearly in FIG. 4, the plurality of slide grooves 116 are formed such that a lip selected from the plurality of lips 118 will slide into a slide groove selected from the plurality of slide grooves 116. The plurality of slide grooves 116 and the plurality of lips 118 interact to form a track system such that the motorized mount 112 physically extends and retracts the first chamber 111 from underneath the horizontal surface 162. Methods to design and fabricate motorized sliding tracks and to attach items to a motorized sliding track are well known and documented in the mechanical arts. The motor 117 is an electric motor that is used to move the first chamber 111 within the motorized mount 112 along the direction of motion determined by the plurality of slide grooves 116. The motor 117 is controlled by a motor controller 135. The motor controller 135 is operated by the control system 103. The control system 103 and the motor controller 135 will move the motorized mount 112 such that access is provided to the charging circuit 102 after the appropriate fee has been received and processed through the electronic payment system.

The charging circuit 102 is adapted for use with the national electric grid 152. The charging circuit 102 comprises a plurality of AC ports 121, a plurality of DC ports 122, an access relay 123, an AC/DC converter 124, an LED 125, and a limit resistor 126. The plurality of DC ports 122, the LED 125 and the limit resistor 126 are connected to the AC/DC converter 124. The plurality of AC ports 121 are connected to the national electric grid 152. The AC/DC converter 124 is connected to the national electric grid 152. Access to the national electric grid 152 is controlled by the access relay 123.

Figure 1:
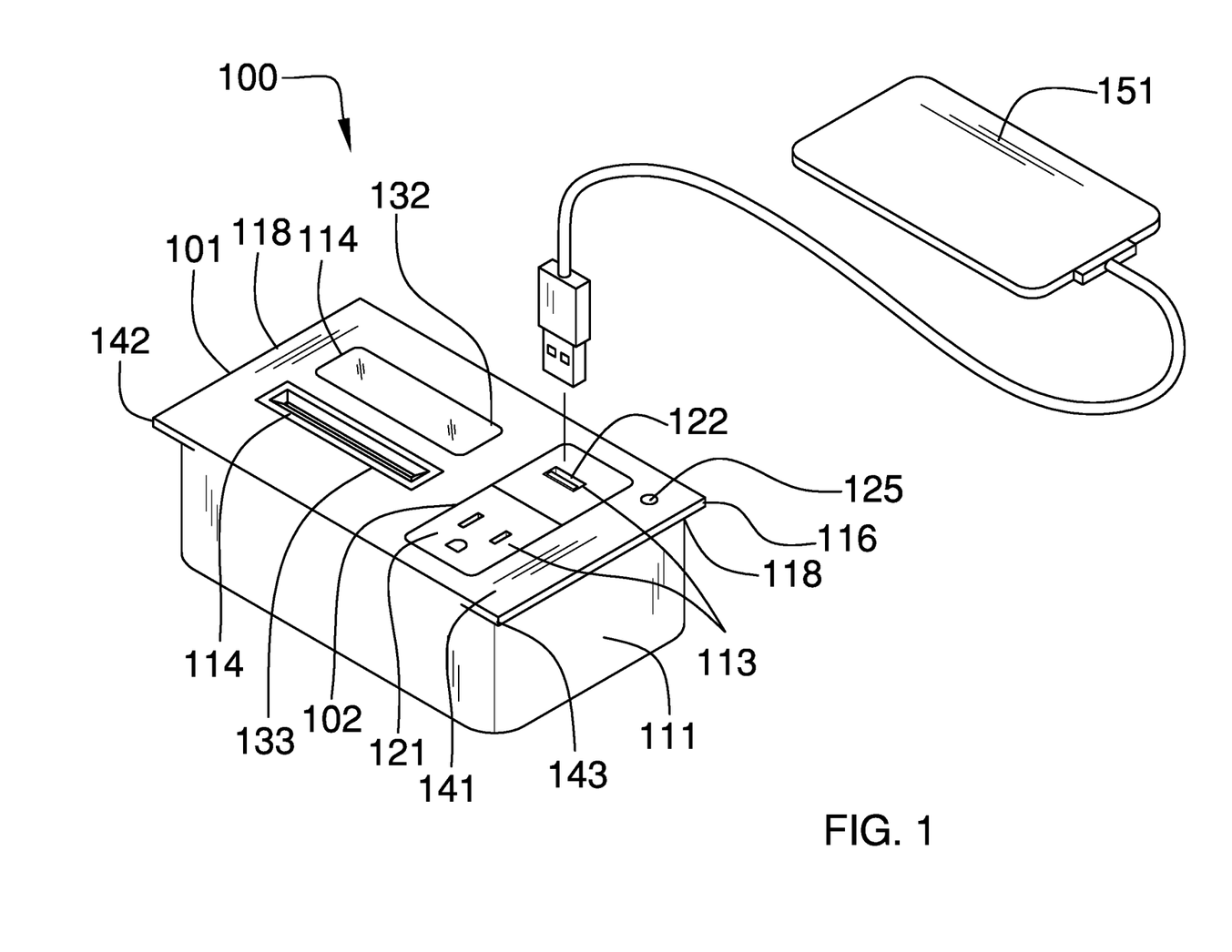
FIG. 1 is a perspective view of an embodiment of the disclosure.
Figure 2:
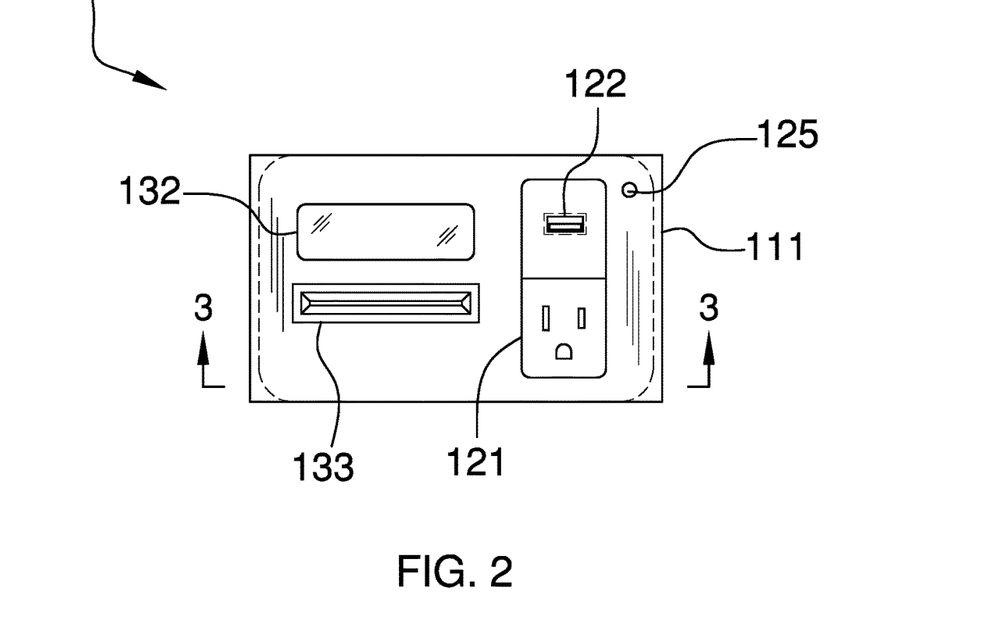
FIG. 2 is a top view of an embodiment of the disclosure.
Figure 3:
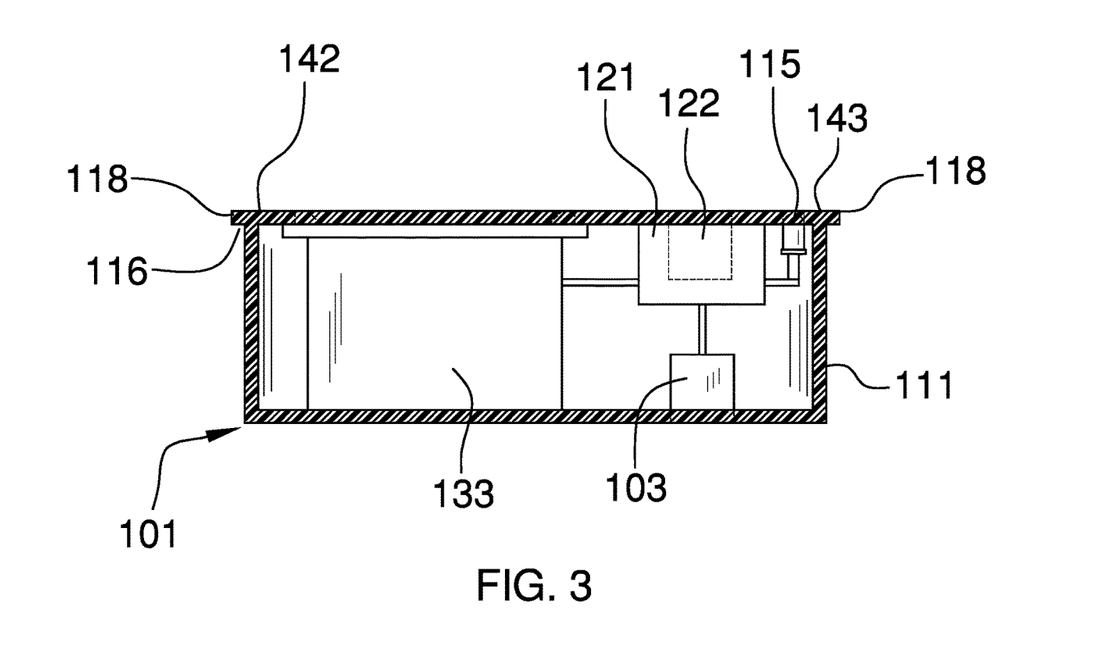
FIG. 3 is a cross-sectional view of an embodiment of the disclosure across 3-3 as shown in FIG. 2.

Each of the plurality of AC ports 121 is a charging port that is designed to provide AC electric power for use by one or more personal data devices 151. In the first potential embodiment of the disclosure, as shown most clearly in FIG. 1, the plurality of AC ports 121 comprises a NEMA 5-15 Electrical Socket that is mounted a charging aperture selected from the plurality of charging apertures 113. Each of the plurality of DC ports 122 is a charging port that is designed to provide DC electric power for use by one or more personal data devices 151. It is recommended that the connection standards for the DC port be selected from the group consisting of USB, Apple Lightning, or Apple 30 pin connections. In the first potential embodiment of the disclosure, as shown in FIG. 1, the plurality of DC ports 122 comprises three USB ports. The access relay 123 is a readily and commercially available relay. The LED 125 and the limit resistor 126 are commercially available. As shown in FIG. 1, the LED 125 is mounted in the first cabinet 101 such that the LED 125 is visible when the charging circuit 102 is accessible. The limit resistor 126 limits the amount of current flowing through the LED 125.

Figure 6:
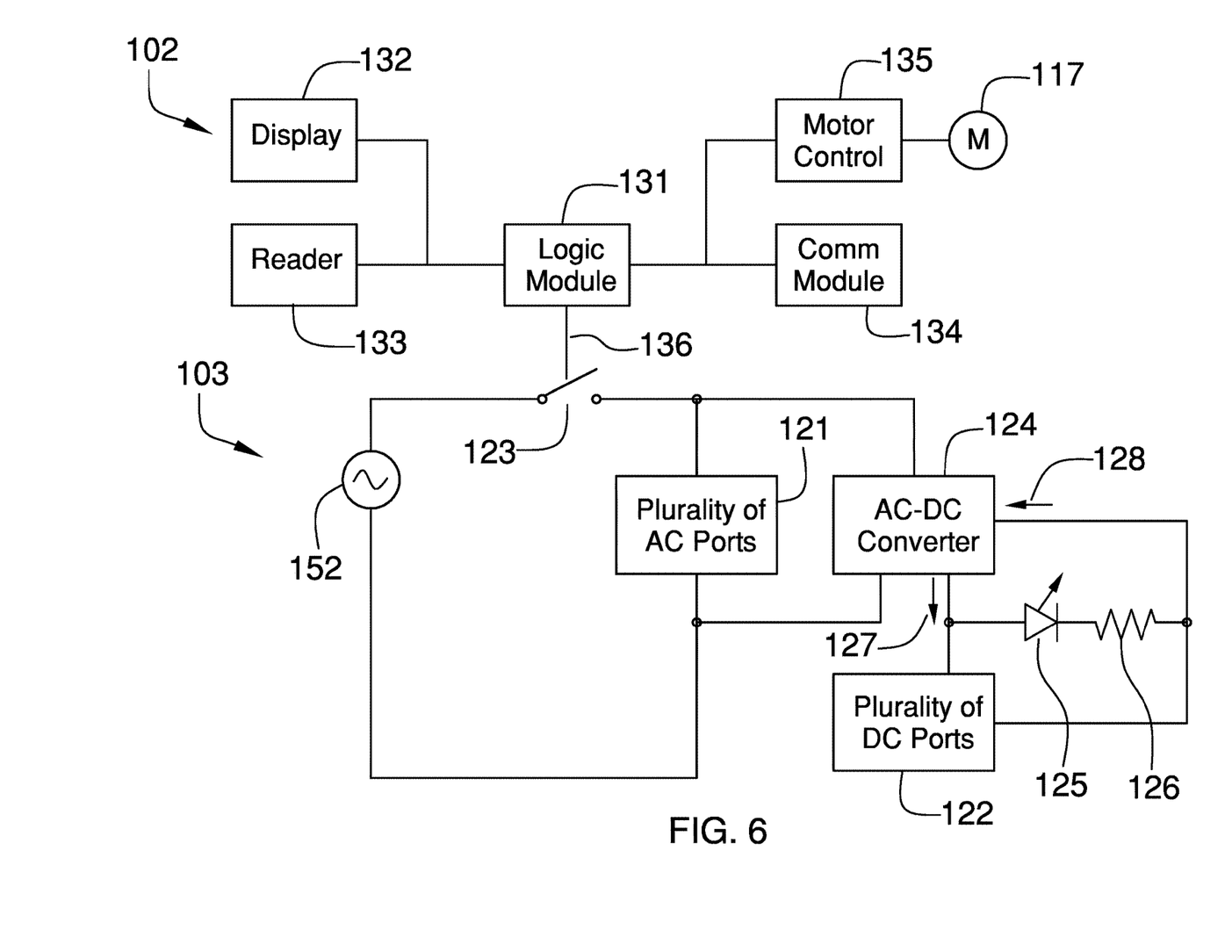
FIG. 6 is a block diagram of an embodiment of the disclosure.

In the first potential embodiment of the disclosure, as shown in FIG. 6, the LED 125 and the limit resistor 126 are wired in series such that when power is applied to the AC/DC converter 124 the LED 125 will illuminate thus visually indicating the charging circuit 102 is active. The AC/DC converter 124 is wired to provide both the positive terminal 127 and the negative terminal 128 of the DC circuit described in this paragraph. The LED 125 and the limit resistor 126 are wired in parallel with the plurality of DC ports 122 between the positive terminal 127 and the negative terminal 128. The AC/DC converter 124 and the plurality of AC ports 121 are wired in parallel to the national electric grid 152. The access relay 123 is wired such that the switch of the access relay 123 is wired in series between the national electric grid 152 and the plurality of AC ports 121 and the AC/DC converter 124 in such a manner that the access relay 123 will interrupt current flow to the plurality of AC ports 121 and the AC/DC converter 124.

The control system 103 comprises a logic module 131, a display 132, a reader 133, a communication module 134, and the motor controller 135. The display 132, the reader 133, the communication module 134, and the motor controller 135 are electrically connected to the logic module 131. The logic module 131 is a readily and commercially available programmable electronic device that is used to control and operate the invention 100. The display 132 is readily and commercially available electrical device that is used as a visual interface to allow the control system 103 to communicate with the user. As shown in FIG. 1, the display 132 is mounted in an aperture selected from the one or more interface apertures 114. The reader 133 is a commercially available electronic device that is used to receive the information necessary to process the appropriate fee through the electronic payment system. In a first potential embodiment of the disclosure, the reader 133 is a readily and commercially available magnetic card reader that is used for processing credit card payments. The magnetic card reader is mounted in an aperture selected from the one or more interface apertures 114. In a second potential embodiment of the disclosure, the reader 133 is a commercially available RFID interrogator that is used in support of a token based payment system, or a hotel key or chip-based system. The communication module 134 is a readily and commercially available communication technology that allows the logic module 131 to verify the information collected from the reader 133 and process the payment of the appropriate fee through the electronic payment system.

The theory of operation of the invention 100 is described in this paragraph. In an initial state, the motorized mount 112 is blocking access to the charging circuit 102. A user accesses the display 132 and the reader 133 through second chamber 115. The logic module 131 provides instruction through the display 132 to the user. The logic module 131 receives payment information through the reader 133. Payment information collected by the reader 133 is processed by the logic module 131 through the communication module 134 to the electronic payment system. When the electronic payment system communicates to the logic module 131 through the communication module 134 that the appropriate fee had been appropriately processed, the logic module 131 sends a signal to the motor controller 135 that causes the motor 117 to open the motorized mount 112 providing access to the plurality of AC ports 121 and the plurality of DC ports 122. The logic module 131 then generates a relay signal which closes the switch portion of the access relay 123 thereby powering the plurality of AC ports 121 and the plurality of DC ports 122.

In a third potential embodiment of the disclosure, the control system 103 is mounted within the second cabinet 104.

Figure 4:
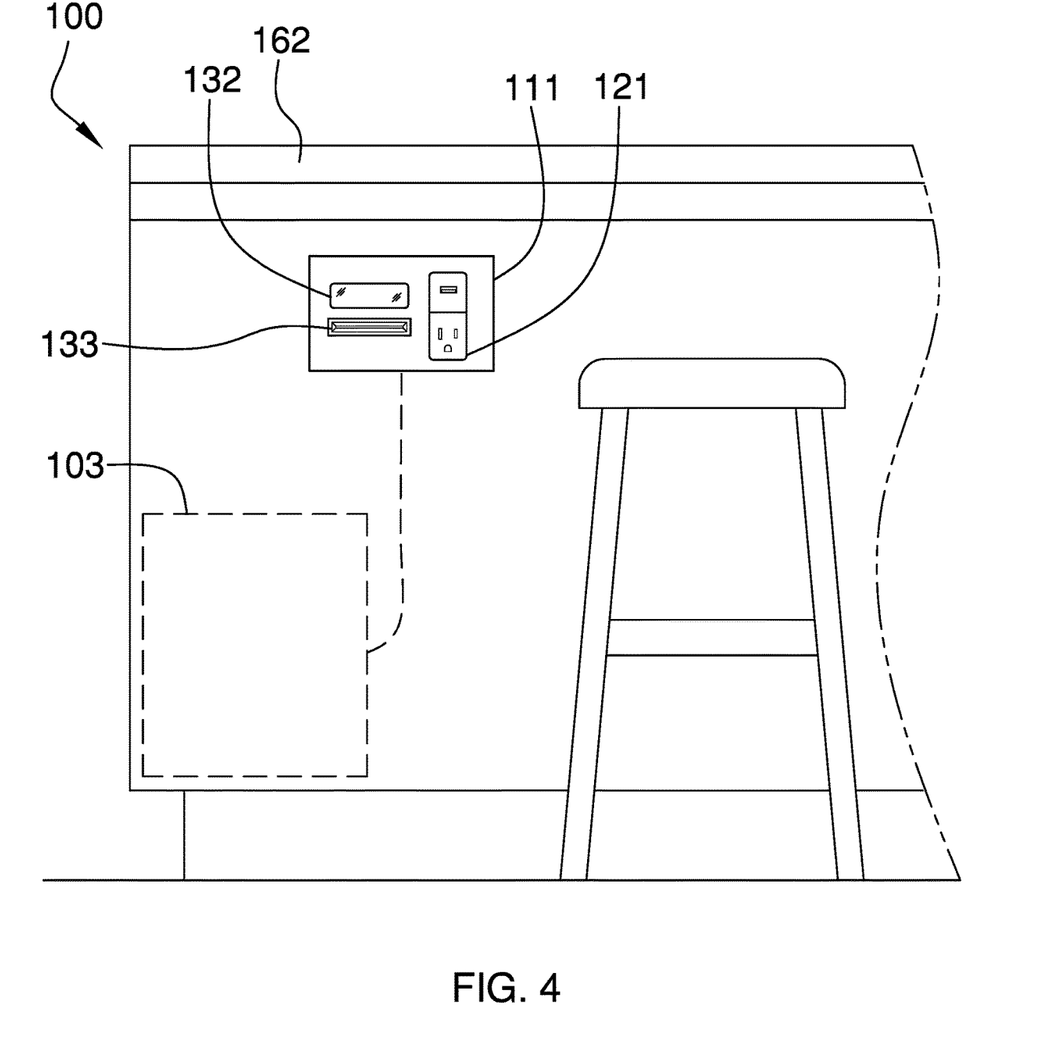
FIG. 4 is an in-use view of an embodiment of the disclosure.
Figure 5:
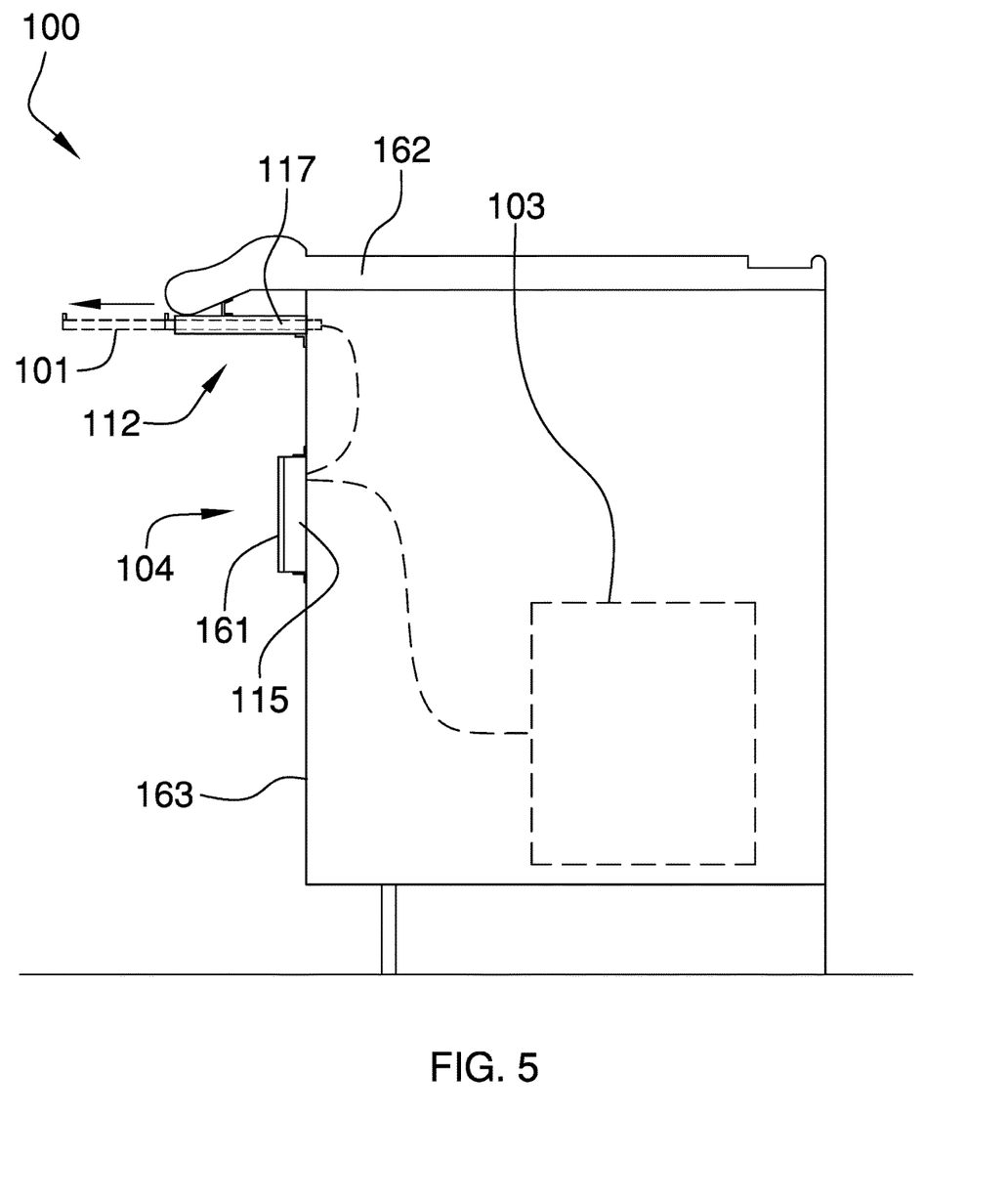
FIG. 5 is an in-use view of an embodiment of the disclosure.

Those skilled in the electrical arts will recognize that modern technology will allow the control system 103 to monitor and control a plurality of charging circuits 102 and a plurality of motors 117 contained within a plurality of cabinets 101. As shown in FIG. 4, in these circumstances, the control system can be housed in a separate cabinet 153 and cabled directly to each first cabinet 101. This can be done with a minimum of difficulty and without undue experimentation.

To use the invention 100 the control system 103 is accessed through the second chamber 115 to process the appropriate fee through the electronic payment system. Once the control system 103 has confirmed payment, the logic module 131 activates the motor controller 135 which activates the motor 117 to move the motorized mount 112 such that access is provided to the plurality of AC ports 121 and the plurality of DC ports 122. The logic module 131 then activates the access relay 123 to provide power to the plurality of AC ports 121 and the plurality of DC ports 122. Once the charging of the one or more personal data devices 151 is completed, the logic module 131 deactivates the access relay 123 and closes the motorized mount 112 such that access to the plurality of AC ports 121 and the plurality of DC ports 122 is blocked.

In the first potential embodiment, the control system 103 is based on an Arduino microcontroller and the associated shields. Displays 132, magnetic strip readers 133, communication modules 134, relays, and motor controllers 135 adapted for use with Arduino microcontrollers are well known and documented in the electrical arts. The control system 103 is mounted in the first cabinet 101.

The following definitions were used in this disclosure:

AC: As used in this disclosure, AC is an acronym for alternating current.

AC/DC Converter: As used in this disclosure, an AC/DC converter is an electrical device that converts an AC voltage into a DC voltage. Method to design and build AC/DC converters are well known in the electrical arts.

Battery: As used in this disclosure, a battery is a container consisting of one or more cells, in which chemical energy is converted into electricity and used as a source of power.

Cable: As used in this disclosure, a cable is a collection of insulated wires covered by a protective casing that is used for transmitting electricity or telecommunication signals.

Control System: As used in this disclosure, a control system is a first device or system that manages and regulates the behavior or operation of a second device or system.

DC: As used in this disclosure, DC is an acronym for direct current.

Diode: As used in this disclosure, a diode is a two terminal semiconductor device that allows current flow in only one direction. The two terminals are called the anode and the cathode.

Display: As used in this disclosure, a display is a surface upon which is projected an image, potentially including, but not limited to, graphic images and text, that is interpretable by an individual viewing the projected image in a meaningful manner.

Electric Motor: In this disclosure, an electric motor is a machine that converts electric energy into rotational mechanical energy.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

LED: As used in this disclosure, an LED is an acronym for a light emitting diode. A light emitting diode is a diode that is also a light source.

Logic Module: As used in this disclosure, a logic module is an electrical device that is programmable and that accepts digital and analog inputs, processes the digital and analog inputs according to previously stored instruction and to provide the results of these instructions as digital or analog outputs.

Magnetic Card Reader: As used in this disclosure, a magnetic card reader is a commercially available device that is used to read electronically stored data off a magnetic strip of the kind commonly found on cards such as credit cards or hotel room keys.

National Electric Grid: As used in this disclosure, the national electric grid is a synchronized and highly interconnected electrical network that distributes energy in the form of electric power from a plurality of generating stations to consumers of electricity.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld device that is used for managing personal information and communication. Examples of personal data device include, but are not limited to, cellular phones, tablets and smart phones.

Port: As used in this disclosure, a port is an electrical termination that is used to connect a first electrical circuit to a second external electrical circuit. In this disclosure, the port is designed to receive a plug.

Relay: As used in this disclosure, a relay is an automatic electromagnetic or electromechanical device that reacts to changes in voltage or current by opening or closing a switch in an electric circuit. Note: Though transistors can be configured to perform switching functions, transistors used for switching functions are handled separately in this disclosure and are explicitly excluded from this definition.

RFID: As used in this disclosure, RFID refers to Radio Frequency Identification technology. RFID is a wireless technology that uses electromagnetic field to identify and retrieve data from tracking tags that are placed on an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. In this disclosure, though the RFID tags are mounted next to active components, the RFID tags themselves are passive, or unpowered, tags.

Rim: As used in this disclosure, a rim is an outer edge or border that follows along the perimeter of an object.

Superior: As used in this disclosure, the term superior refers to a directional reference that is parallel to and in the opposite direction of the force of gravity.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Token Based Payment System: As used in this disclosure, a token based payment is an electronic based payment system wherein an interrogator maintained by the receiver of the payment interrogates a token held by the maker of the payment. The token is interrogated by the interrogator to identify the payer. Once the payer is identified, a system associated with the interrogator will confirm the identity of payee through the token and based on that identification receive an electronic payment based on the confirmed identity. A common example of this technology is a near field communication payment system, which is often referred to as a contactless system. In this system, a personal data device of the payee is used as the token. The interrogator will interrogate the personal data device using RFID technology.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A charging device comprising:

A first cabinet, a charging circuit, a control system, and a second cabinet;

wherein the charging circuit is contained within the first cabinet;

wherein the control system is electrically connected to the charging circuit;

wherein the control system is electrically connected to the second cabinet;

wherein the charging device is adapted for use in charging one or more personal data devices;

wherein the charging device is adapted for use with one or more electronic payment systems selected from the group consisting of credit card payment systems or a token based payment system;

wherein the charging device is adapted for use with the national electric grid;

wherein the charging device is a switched charging station that distributes electric power to the one or more personal data devices on a fee for service basis;
wherein the charging circuit is configured for use with the national electric grid;
wherein the charging circuit comprises a plurality of AC ports, a plurality of DC ports, an access relay, an AC/DC converter, an LED, and a limit resistor;
wherein the plurality of DC ports, the LED and the limit resistor are connected to the AC/DC converter;
wherein the plurality of AC ports are connected to the national electric grid;
wherein the AC/DC converter is connected to the national electric grid;
wherein access to the national electric grid is controlled by the access relay;
wherein the access relay is an electrical relay;
wherein the LED is an electrical device;
wherein the limit resistor is an electrical device;
wherein the LED is mounted in the first cabinet such that the LED is visible when the charging circuit is accessible;
wherein the LED and the limit resistor are wired in series such that when power is applied to the AC/DC converter the LED will illuminate;
wherein the first cabinet comprises a first chamber, a motorized mount, and a plurality of charging apertures;
wherein the plurality of charging apertures are apertures that are formed within the first chamber;
wherein the first chamber is mounted in the motorized mount;
wherein the second cabinet comprises a second chamber and one or more interface apertures;
wherein the one or more interface apertures are apertures that are mounted in and accessible through the second chamber;
wherein the first chamber is a first hollow rectangular box that further comprises a plurality of lips;
wherein the first chamber is further defined with a first face;
wherein the first face is the surface of the first chamber within which the plurality of charging apertures are formed;
wherein the first face is further defined with a first edge and a second edge;
wherein the first edge is an edge selected from the edges that form the perimeter of the first face;
wherein the second edge is the edge along the perimeter of the first face that is distal from the first edge;
wherein both the first edge and the second edge will have a lip selected from the plurality of lips formed along it;
wherein each of the plurality of lips is a rim that projects away from the interior of the first chamber from an edge selected from the first edge or the second edge;
wherein the second chamber is a second hollow rectangular box;
wherein the second chamber is further defined with a second face;
wherein the second face is the surface of the second chamber within which one or more interface apertures are located;
wherein the second chamber is mounted on a vertical surface such that the one or more interface apertures are readily accessible;
wherein the motorized mount prevents access to the plurality of charging apertures;
wherein the first chamber is mounted in the motorized mount such that the plurality of charging apertures form the superior surface of the first chamber;
wherein the motorized mount is attached on the inferior side of a horizontal structure such that access to the first face is blocked until payment for services is received.

2. The charging device according to claim 1
wherein the motorized mount is a structure that further comprises a plurality of slide grooves, and a motor;
wherein the plurality of slide grooves are formed such that a lip selected from the plurality of lips will slide into a slide groove selected from the plurality of slide grooves;
wherein the plurality of slide grooves and the plurality of lips interact to form a track system such that the motorized mount physically extends and retracts the first chamber from underneath the horizontal surface;
wherein the motor is controlled by a motor controller;
wherein the motor controller is operated by the control system.

3. The charging device according to claim 2
wherein each of the plurality of AC ports is a charging port that provides AC electric power for use by the one or more personal data devices;
wherein each of the plurality of AC ports comprises a NEMA 5-15 electrical socket that is mounted a charging aperture selected from the plurality of charging apertures.

4. The charging device according to claim 3 wherein each of the plurality of DC ports is a charging port that is designed to provide DC electric power for use by the one or more personal data devices.

5. The charging device according to claim 4
wherein the AC/DC converter is wired to provide both the positive terminal and the negative terminal of the DC circuit;
wherein the LED and the limit resistor are wired in parallel with the plurality of DC ports between the positive terminal and the negative terminal;
wherein the AC/DC converter and the plurality of AC ports are wired in parallel to the national electric grid.

6. The charging device according to claim 5 wherein the access relay is wired such that the switch of the access relay is wired in series between the national electric grid and the plurality of AC ports and the AC/DC converter in such a manner that the access relay will interrupt current flow to the plurality of AC ports and the AC/DC converter.

7. The charging device according to claim 6
wherein the control system comprises a logic module, a display, a reader, a communication module, and the motor controller;
wherein the display, the reader, the communication module, and the motor controller are electrically connected to the logic module.

8. The charging device according to claim 7
wherein the logic module is a programmable electronic device that is used to control and operate the charging device;
wherein the display is an electrical device that is used as a visual interface;
wherein the display is mounted in an aperture selected from the one or more interface apertures;
wherein the reader is a magnetic card reader that is intended for use in processing credit card payments;
wherein the reader receives the information necessary to process the appropriate fee through the electronic payment system;

wherein the magnetic card reader is mounted in an aperture selected from the one or more interface apertures.

9. The charging device according to claim 8 wherein the communication module verifies the information collected from the reader and processes the payment of the appropriate fee through the electronic payment system.

10. The charging device according to claim 7
wherein the logic module is a programmable electronic device that is used to control and operate the charging device;
wherein the display is an electrical device that is used as a visual interface;
wherein the display is mounted in an aperture selected from the one or more interface apertures;
wherein the reader is an RFID interrogator that is used in support of a token based payment system.

11. The charging device according to claim 10 wherein the communication module verifies the information collected from the reader and processes the payment of the appropriate fee through the electronic payment system.

* * * * *